(No Model.)

J. & A. B. C. DOWDELL.
APPARATUS FOR MAKING WINE.

No. 494,982. Patented Apr. 4, 1893.

Witnesses.

Inventors.
J. Dowdell
A. B. C. Dowdell
by
A. H. Ste Marie
atty

UNITED STATES PATENT OFFICE.

JAMES DOWDELL AND ARTHUR B. C. DOWDELL, OF ST. HELENA, CALIFORNIA.

APPARATUS FOR MAKING WINE.

SPECIFICATION forming part of Letters Patent No. 494,982, dated April 4, 1893.

Application filed August 20, 1891. Serial No. 403,217. (No model.)

*To all whom it may concern:*

Be it known that we, JAMES DOWDELL and ARTHUR B. C. DOWDELL, both citizens of the United States, and residents of St. Helena, in the county of Napa and State of California, have invented a new and useful Apparatus for Making Wine, of which the following is a specification.

The object of our improvements is twofold: First, we aim to improve the quality of wine by following a mode of pressing through which the liquid part of the grapes, in the case of white wine, may be freed at once from the other parts, and its contact therewith in the case of red wine, will not effect any other result but what is contemplated. Second, we propose to simplify the manufacture of wine to such a degree that grape-growers and other persons of limited means may be able to engage in this industry with fair chances of success, owing to the cheapness of the apparatus proffered and the great saving of labor effected by our method of handling the vintage.

So far as we have been able to ascertain, the most customary way of making wine is to crush the grapes over a tank, into which the whole mass of mashed pulp, skins, seeds, stems and juice is caused to fall and where it is allowed to stand until the lighter parts float to the surface, when the liquid, or must, is drawn off and the marc shoveled out and carried to a press to be subjected to pressure so as to secure the juice which it still contains. These operations are repeated over and over again, with the use of the same tanks and implements, until the wine season is at an end. Aside from the fact that white wine is injured, both in color and flavor, by leaving the pulp and refuse steep in the juice in the manner pointed out, be it only for a short time, there forms in the tank, through the successive fillings and refillings, a kind of yeast which creates an unnatural and premature fermentation in wines of either the white or red varieties, and greatly impairs their value. The pressing, as usually performed, involves, besides, a great deal of labor and an unwarranted loss of time, in so far that the marc is uselessly, though unavoidably, handled three or four times, not to speak of the tedious and slow work of operating cumbersome machinery. All these drawbacks are done away with by the use of an improved process and apparatus of the class to which our invention belongs.

Figure 1:
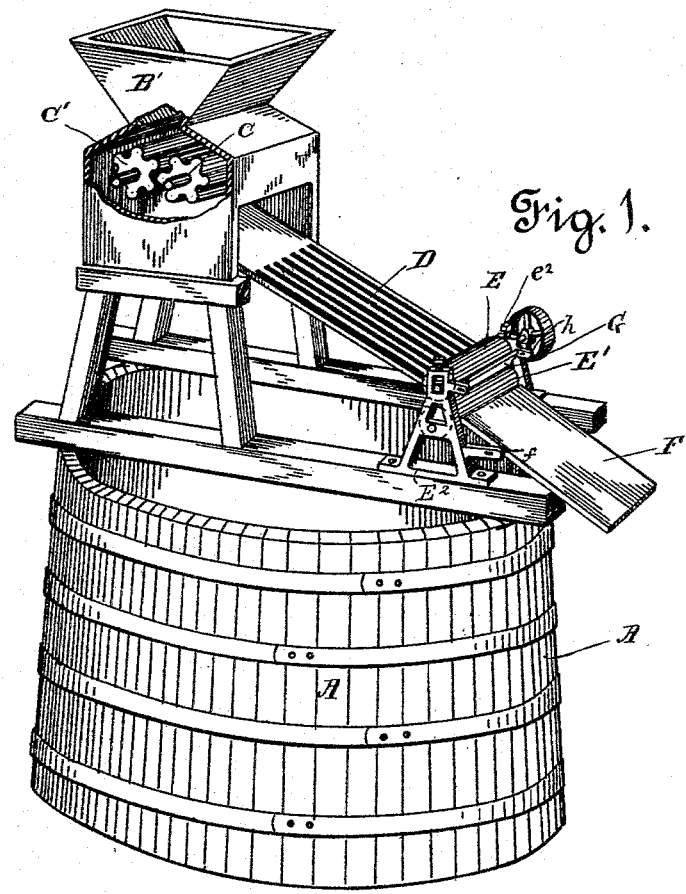
Figure 2:
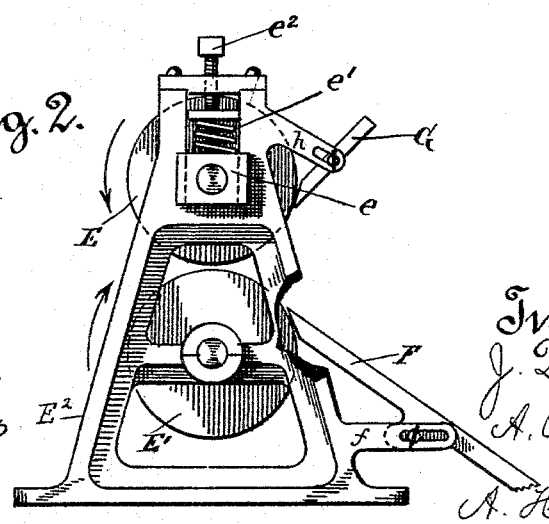

Referring to the drawings, Figure 1 is a general perspective view of our apparatus; and Fig. 2 is an enlarged view, in elevation of that part of the machinery where the pressing is done.

A represents a tank of the ordinary type used in wine cellars. It is over such a tank that both the crushing and pressing of grapes are accomplished. The crushing is effected by means of corrugated rollers, C C', within an open box, B, which is provided with a hopper, B', and mounted on one end of bars or timbers, A', laid across the top of the tank A. The grapes having been mashed by the rollers C C', slide down a grating or lattice-work, D into the box B and leading to pressure-rollers, E, E', which are fitted in a low frame, $E^2$, mounted on the opposite end of the bars A'. The juice already squeezed out of the grapes naturally runs into the tank, through the open spaces or perforations in the lattice or grating, while the pulp and other coarser elements keep moving down the incline in a thin, wide sheet, toward the pressure rollers.

The rollers E E' are made preferably of rubber, or some other soft, smooth substance, lest they should grind the seeds which pass between them and thereby impart a bitter taste to the wine. The upper one, E, is mounted in sliding blocks, $e$, controlled by springs, $e'$, and set-screws, $e^2$, so that the distance between the two rollers may be regulated to suit and restored to the normal, should a stone or some hard body force them apart. The crushed grapes being fed to these rollers in a thin layer, as before stated, the juice still confined therein is readily extracted or wrung out, so to speak, and thereupon finds its way into the tank, through the interstices between the grating bars, while the now dry pulp and refuse fall down a chute, F, into a wagon or other conveyance to be hauled away.

The chute F is adjustably mounted in brackets, $f$, projecting outwardly from the frame $E^2$, and is beveled at its inner end so as to lie close to the roller E' and prevent the refuse from falling into the tank. This beveled end of the chute also acts as a scraper for the lower roller. As to the upper roller it is kept clean by a separate scraper, G, adjustably mounted in brackets, $h$, jutting out of the upper part of the frame $E^2$. White wines from either white or red grapes are thus made at one continuous operation. As to red wines, in which the pulp and other matters are allowed to remain long enough for the liquid to draw out some of the pigment which they possess, the crushing and pressing have necessarily to be done at separate intervals, but the process of manufacture is otherwise the same, that is to say the grapes are first crushed between the rollers C C' and allowed to fall entirely into the tank where they remain for some time; then the liquid part is drawn off and the marc passed to another tank over the lattice-work and between the pressing rollers, as hereinbefore described.

Our improved apparatus possesses many advantages which will be duly appreciated by all practical wine-makers. Among other features may be cited the simplicity of the device designed by us, its extreme cheapness, as compared with the cost of machines now in use, and its adaptability to perform rapid and thorough work. On the other hand, the process of manufacture carried out by our apparatus highly commends itself to the attention of people interested in the wine industry, since it affords them a means, not only to secure the greatest possible quantity of wine out of a given quantity of grapes, but also to obtain it in the highest degree of purity attainable, and this in a much shorter time and at a much smaller expenditure than can be done by following the old-fashioned method above referred to. The immediate pressing of the pulp after crushing and the following separation of all refuse matter from the juice greatly improves the quanlity, tone, color and aroma of white wines. The quality of red wines is likewise improved by pressing the steeped marc in a thin sheet instead of dumping it into the common press from which the liquid part has to percolate through a large body of refuse matter. The pressing of the marc in a thin layer also allows every particle of it to come in direct and actual contact with the pressure rollers and insures perfect extraction of the juice, whereas the pressing in bulk as effected in the ordinary screw or hydraulic presses leads to loss of time and often to loss of liquid, owing to the fact that much of the juice finds itself imprisoned in the center of the mass and will come out only after extraordinary pressure and frequent stoppages. The pressing over the tanks, coupled with the simplicity of our pressing apparatus saves much handling and re-handling of the vintage, and therefore spares most of the expense connected with the manufacture of wine.

Having described our invention, what we claim as new, and desire to secure by Letters Patent of the United States, is—

The improved wine press herein described and shown consisting of the timbers A', the open box mounted on one end of said timbers, and containing the crushing rollers the frame $E^2$ mounted on the opposite end of said timbers and provided with the offsets $f$ $h$, the pressure rollers mounted in the frame $E^2$, the inclined grating leading from below the crushing rollers to the pressure rollers, the chute adjustably secured in the offset $f$ and having its upper end bearing upon the lower pressure roller, and the scraper mounted in the offset $h$ and bearing on the upper pressure roller.

In testimony whereof we affix our signatures in presence of two witnesses.

JAMES DOWDELL. [L. S.]
ARTHUR B. C. DOWDELL. [L. S.]

Witnesses:
I. J. NEWKIRK,
P. H. HOLIHAN.

Corrections in Letters Patent No. 494,982.

It is hereby certified that in Letters Patent No. 494,982, granted April 4, 1893, upon the application of James Dowdell and Arthur B. C. Dowdell, of St. Helena, California, for an improvement in "Apparatus for Making Wine," errors appear in the printed specification requiring correction, as follows: In line 71, page 1, a comma and the word *projecting* should be inserted after the reference letter " D," and in line 42, page 2, the word " quanlity" should read *quality;* and that the Letters Patent should be read with these corrections therein that the same may conform to the record of the case in the Patent Office.

Signed, countersigned, and sealed this 2d day of May, A. D. 1893.

[SEAL.]                           GEO. CHANDLER,
*First Assistant Secretary of the Interior.*

Countersigned:
    S. T. FISHER,
        *Acting Commissioner of Patents.*